(12) United States Patent
Mukai et al.

(10) Patent No.: US 12,186,836 B2
(45) Date of Patent: Jan. 7, 2025

(54) FLUX-CORED WIRE, WELDING METHOD, AND WELD METAL

(71) Applicant: Kobe Steel, Ltd., Kobe (JP)

(72) Inventors: Naoki Mukai, Fujisawa (JP); Shun Izutani, Fujisawa (JP); Takashi Yashima, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 755 days.

(21) Appl. No.: 17/600,249

(22) PCT Filed: May 1, 2020

(86) PCT No.: PCT/JP2020/018450
§ 371 (c)(1),
(2) Date: Sep. 30, 2021

(87) PCT Pub. No.: WO2020/226146
PCT Pub. Date: Nov. 12, 2020

(65) Prior Publication Data
US 2022/0219266 A1    Jul. 14, 2022

(30) Foreign Application Priority Data
May 9, 2019 (JP) .................................. 2019-089013

(51) Int. Cl.
*B23K 35/368* (2006.01)
*B23K 35/02* (2006.01)
(Continued)

(52) U.S. Cl.
CPC ........ *B23K 35/368* (2013.01); *B23K 35/0266* (2013.01); *B23K 35/3053* (2013.01);
(Continued)

(58) Field of Classification Search
CPC .............. B23K 35/368; B23K 35/0266; B23K 35/3053; B23K 35/3602; B23K 35/3605;
(Continued)

(56) References Cited

U.S. PATENT DOCUMENTS

| | | |
|---|---|---|
| 6,441,334 B1 | 8/2002 | Aida et al. |
| 2008/0093351 A1* | 4/2008 | Matsushita ........ B23K 35/3053 219/145.22 |

(Continued)

FOREIGN PATENT DOCUMENTS

| | | |
|---|---|---|
| EP | 3 427 883 A1 | 1/2019 |
| JP | 60-127097 A | 7/1985 |

(Continued)

OTHER PUBLICATIONS

Extended European Search Report issued Jun. 23, 2023 in European Application 20801452.2, 8 pages.
(Continued)

*Primary Examiner* — John P. Dulka
(74) *Attorney, Agent, or Firm* — Oblon, McClelland, Maier & Neustadt, L.L.P.

(57) ABSTRACT

The present invention relates to a flux-cored wire for positive polarity gas-shielded arc welding use, in which a flux contains a metal powder and also contains $BaF_2$ and $SrF_2$ and $AlF_3$ and/or $CaF_2$ as fluorides wherein the content of $BaF_2$ is 1.0 to 4.5%, the content of $SrF_2$ is 2.0% or less, the content of $CaF_2$ is 0.45% or less and the content of $AlF_3$ is 0.70% or less, at least one of metal elements constituting the flux and the fluorides is a strong deoxidizing metal element having a specified standard formation Gibbs energy, and the content of each of an oxide and a carbonate in the flux is 0.5% or less.

14 Claims, 3 Drawing Sheets

(51) Int. Cl.
*B23K 35/30* (2006.01)
*C22C 38/00* (2006.01)
*C22C 38/02* (2006.01)
*C22C 38/04* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/54* (2006.01)

(52) U.S. Cl.
CPC .......... *C22C 38/001* (2013.01); *C22C 38/002* (2013.01); *C22C 38/005* (2013.01); *C22C 38/02* (2013.01); *C22C 38/04* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01)

(58) Field of Classification Search
CPC .. B23K 35/362; B23K 35/383; C22C 38/001; C22C 38/002; C22C 38/005; C22C 38/02; C22C 38/04; C22C 38/42; C22C 38/44; C22C 38/46; C22C 38/48; C22C 38/50; C22C 38/54

See application file for complete search history.

(56) References Cited

U.S. PATENT DOCUMENTS

2019/0030636 A1* 1/2019 Mukai ................ B23K 35/3607
2022/0362892 A1* 11/2022 Ishizaki .................. C22C 38/50

FOREIGN PATENT DOCUMENTS

| | | |
|---|---|---|
| JP | 11-58069 A | 3/1999 |
| JP | 11-207491 A | 8/1999 |
| JP | 2016-83677 A | 5/2016 |
| WO | WO 2017/013965 A1 | 1/2017 |

OTHER PUBLICATIONS

International Search Report issued on Jul. 28, 2020 in PCT/JP2020/018450 filed May 1, 2020, 2 pages.

* cited by examiner

FLUX-CORED WIRE, WELDING METHOD, AND WELD METAL

TECHNICAL FIELD

The present invention relates to a flux-cored wire and specifically to a flux-cored wire suitably used for all welding positions and excellent in terms of welding performance and welding efficiency. The present invention also relates to a welding method in which the flux-cored wire is used and a weld metal formed using the flux-cored wire.

BACKGROUND ART

Flux-cored wires originally have so broad utility that they can be used for all welding positions, such as a flat welding position, a vertical welding position, a horizontal welding position, and an overhead welding position. However, it is more difficult to perform welding in the horizontal, vertical, and overhead welding positions than in the flat welding position. Thus, it has been difficult to achieve suitable welding performance in all welding positions.

In this respect, PTL 1 discloses a gas-shielded arc welding flux-cored wire that includes specific amounts of Al, Mg, and $BaF_2$ as essential flux components, wherein the flux filling ratio and the contents of Mn and Si relative to the total mass of the wire are optimized. When direct-current straight-polarity gas-shielded arc welding is performed using the above flux-cored wire in a low to middle welding current range, the amount of spatter generated is small in all welding positions. Furthermore, suitable weldability is achieved, and a weld metal having suitable toughness can be formed. Note that the low to middle welding current range described in PTL 1 is about 50 to 300 A.

PTL 2 discloses a carbon dioxide gas arc welding flux-cored wire that includes specific amounts of Al, Mg, and $BaF_2$ as essential flux components, wherein the content of Zr relative to the total mass of the wire is optimized. When direct-current straight-polarity arc welding of a galvanized steel sheet is performed using the above flux-cored wire in a low to middle welding current range, suitable weldability is achieved and the amount of spatter generated is small in all welding positions. Furthermore, a weld metal having suitable toughness can be formed. Note that the low to middle welding current range described in PTL 2 is about 70 to 300 A.

CITATION LIST

Patent Literature

PTL 1: Japanese Unexamined Patent Application Publication No. 11-058069
PTL 2: Japanese Unexamined Patent Application Publication No. 11-207491

SUMMARY OF INVENTION

Technical Problem

The upper limit for the welding current that can be applied to the flux-cored wires disclosed in PTLs 1 and 2 is about 300 A. However, in reality, welding is performed at a welding current of 200 A and a welding speed of 15 cm/min in vertical welding, which is difficult to perform.

Thus, in the positions in which a molten pool is affected by gravity, such as a vertical position, an increase in welding current or welding speed results in an increase in the occurrence of bead shape defects, such as burn-through, overlap, and undercut. Therefore, when welding is performed in such a position, it is necessary to perform welding in a low current range and at a low welding speed. Thus, there is room for improvement in terms of efficiency of welding operation. In particular, among various welding positions, overhead welding is most affected by a gravitational force that acts on a molten pool. Accordingly, in overhead welding, it is necessary to reduce the welding current and the welding speed most and it has been difficult to increase the efficiency.

Accordingly, an object of the present invention is to provide a flux-cored wire that prevents burn-through, forms a bead having a suitable shape, and has a high-deposition performance when used in all welding positions and, in particular, in overhead welding.

Solution to Problem

The inventors of the present invention have conducted extensive studies and consequently found that the above-described issues can be addressed when a flux included in the flux-cored wire includes a specific fluoride powder and a specific strong deoxidizing metal element and the composition thereof is adjusted to fall within a specific range. Thus, the present invention was made.

Specifically, the present invention relates to [1] to [14] below.

[1] A flux-cored wire for straight polarity gas-shielded arc welding, the flux-cored wire including a flux including a fluoride powder and a metal powder, wherein the fluoride powder includes $BaF_2$ and at least one selected from the group consisting of $SrF_2$, $AlF_3$, and $CaF_2$, and contents of the $BaF_2$, the $SrF_2$, the $AlF_3$, and the $CaF_2$ satisfy, in terms of mass % relative to a total mass of the wire, $BaF_2$: 1.0% to 4.5%,
$SrF_2$: 2.0% or less,
$CaF_2$: 0.45% or less, and
$AlF_3$: 0.70% or less, wherein at least one of a metal element constituting the fluoride powder and a metal element constituting the metal powder is a strong deoxidizing metal element having at least one standard Gibbs energy of formation of −200 to −150 kcal/molO$_2$ at 1500° C. to 1600° C. in an Ellingham diagram of an oxide of the strong deoxidizing metal element, and wherein contents of an oxide and a carbonate in the flux satisfy, in terms of mass % relative to the total mass of the wire, oxide: 0.5% or less, and
carbonate: 0.5% or less.

[2] The flux-cored wire described in [1], wherein the contents of the $SrF_2$, the $AlF_3$, and the $CaF_2$ in the fluoride powder satisfy a relationship below in terms of mass % relative to the total mass of the wire:

$$0.5 \leq SrF_2(\%) + 10.1 \times CaF_2(\%) + 2.3 \times AlF_3(\%)$$

[3] The flux-cored wire described in [1], wherein the strong deoxidizing metal element is at least one element selected from the group consisting of Al, Mg, and Zr, and contents of the Al, the Mg, and the Zr satisfy, in terms of amount of substance relative to the total mass of the wire, Al: $12 \times 10^{-4}$ mol/g or less,
Mg: $5 \times 10^{-4}$ mol/g or less,
Zr: $5 \times 10^{-4}$ mol/g or less, and
(Al+Mg+Zr): $8 \times 10^{-4}$ to $15 \times 10^{-4}$ mol/g.

[4] The flux-cored wire described in [1], wherein a content of the flux is 10% to 20% in terms of mass % relative to the total mass of the wire.

[5] The flux-cored wire described in [1], wherein a total content of the fluoride powder is more than 2% and 6% or less in terms of mass % relative to the total mass of the wire, wherein a total content of the $BaF_2$, the $SrF_2$, the $AlF_3$, and the $CaF_2$ is more than 2% and 5% or less in terms of mass % relative to the total mass of the wire, and wherein a ratio of the total content of the $BaF_2$, the $SrF_2$, the $AlF_3$, and the $CaF_2$ to the total content of the fluoride powder $\{(BaF_2+SrF_2+AlF_3+CaF_2)/\text{Total of fluoride powder}\}$ is 0.5 or more.

[6] The flux-cored wire described in [1], wherein a composition of the flux-cored wire further satisfies, in terms of mass % relative to the total mass of the wire,
C: 0.5% or less,
Si: 2.0% or less,
Mn: 3.0% or loss,
Ni: 5% or less,
Mo: 3.0% or less,
W: 3.0% or less,
Nb: 3.0% or less,
V: 3.0% or less,
Cr: 5% or less,
Ti: 3.0% or less,
N: 0.05% or less,
S: 0.05% or less,
P: 0.05% or less,
B: 0.05% or less,
Cu: 2.0% or less,
Ta: 3.0% or less, and
REM: 0.1% or less.

[7] The flux-cored wire described in [1], wherein a composition of the flux-cored wire further satisfies, in terms of mass % relative to the total mass of the wire,
C: 0.5% or less,
Si: 2.0% or less,
Mn: 3.0% or less,
Ni: 5% to 20%,
Mo: 5.0% or less,
W: 3.0% or less,
Nb: 3.0% or less,
V: 3.0% or less,
Cr: 15% to 30%,
Ti: 3.0% or less,
N: 0.50% or less,
S: 0.05% or less,
P: 0.05% or loss,
B: 0.05% or loss,
Cu: 2.0% or less,
Ta: 3.0% or less, and
REM: 0.1% or less.

[8] The flux-cored wire described in [6], wherein a total content of a metal powder and a metal compound that are constituted by one or a plurality of alkali metal elements in the flux-cored wire is 3% or less in terms of mass % relative to the total mass of the wire, and the balance includes Fe and impurities.

[9] The flux-cored wire described in [7], wherein a total content of a metal powder and a metal compound that are constituted by one or a plurality of alkali metal elements in the flux-cored wire is 3% or less in terms of mass % relative to the total mass of the wire, and the balance includes Fe and impurities.

[10] The flux-cored wire described in [1], wherein the strong deoxidizing metal element includes Mg in a form of a metal powder containing Mg, and a content of Mg included in the metal powder containing Mg and the content of the $AlF_3$ satisfy a relationship below in terms of amount of substance relative to the total mass of the wire:

$1.0 \times 10^{-4} \leq Mg\,(mol/g) + AlF_3\,(mol/g) \leq 5.0 \times 10^{-4}$

[11] A welding method in which a flux-cored wire for straight polarity and a shielding gas are used,
wherein the flux-cored wire includes a flux including a fluoride powder and a metal powder,
wherein the fluoride powder includes $BaF_2$ and at least one selected from the group consisting of $SrF_2$, $AlF_3$, and $CaF_2$, and contents of the $BaF_2$, the $SrF_2$, the $AlF_3$, and the $CaF_2$ satisfy, in terms of mass % relative to a total mass of the wire,
$BaF_2$: 1.0% to 4.5%,
$SrF_2$: 2.0% or less,
$CaF_2$: 0.45% or less, and
$AlF_3$: 0.70% or less,
wherein at least one of a metal element constituting the fluoride powder and a metal element constituting the metal powder is a strong deoxidizing metal element having at least one standard Gibbs energy of formation of −200 to −150 kcal/molO$_2$ at 1500° C. to 1600° C. in an Ellingham diagram of an oxide of the strong deoxidizing metal element, and
wherein contents of an oxide and a carbonate in the flux satisfy, in terms of mass % relative to the total mass of the wire,
oxide: 0.5% or loss, and
carbonate: 0.5% or less.

[12] The welding method described in [11], wherein the shielding gas includes a $CO_2$ gas at a proportion of 60% by volume or more.

[13] The welding method described in [11], wherein the shielding gas includes an Ar gas at a proportion of 60% by volume or more.

[14] A weld metal formed by performing welding using the flux-cored wire described in any one of [1] to [10].

Advantageous Effects of Invention

The flux-cored wire according to the present invention and a welding method in which the flux-cored wire is used increase the amount of the flux-cored wire deposited by controlling the heat energy applied to the flux-cored wire with an additive element. This increases the efficiency of welding operation. In addition, a suitable oxide film can be formed on the surface of a molten pool. This prevents burn-through and forms a bead having a suitable shape in all welding positions and, in particular, in overhead welding.

DESCRIPTION OF EMBODIMENTS

Figure 1:
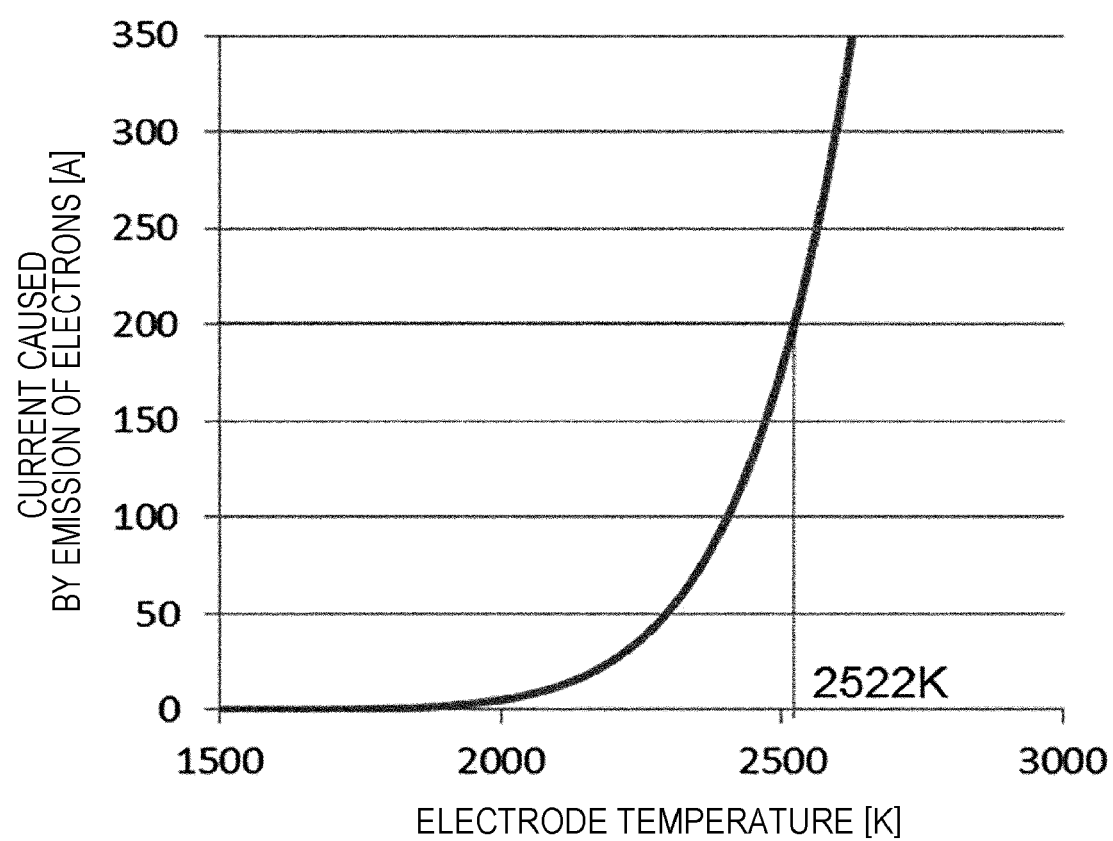
FIG. 1 is a graph illustrating a change in the temperature of a thoriated tungsten electrode.

A mode (embodiment) in which the flux-cored wire according to the present invention, a welding method in which the flux-cored wire is used, and a weld metal formed using the flux-cored wire are implemented is described below. The following embodiment is merely an example and is not intended to limit the present invention. Note that the symbol "%" denotes "% by mass" unless otherwise specified.

<<Flux-Cored Wire>>

A flux-cored wire according to this embodiment (hereinafter, referred to simply as "wire") is used for straight polarity gas-shielded arc welding and constituted by a tubular sheath and a flux filled inside of the sheath. Note that the term "straight polarity" used herein refers to an electrode arrangement in which the wire is negative and the base metal is positive.

The flux-cored wire may be either a seamless flux-cored wire that does not have any seam formed in the sheath or a seamed flux-cored wire having a seam formed in the sheath. The flux-cored wire may, but does not necessarily, include a copper plating layer deposited on the surface of the wire, that is, on the outer surface of the sheath. The material constituting the sheath is not limited and may be mild steel or stainless stool. The material constituting the sheath may be any material with which the features of the present invention can be satisfied.

The flux included in the flux-cored wire according to this embodiment includes a fluoride powder and a metal powder.

The fluoride powder includes $BaF_2$ and at least one selected from the group consisting of $SrF_2$, $AlF_3$, and $CaF_2$. The contents of the above fluorides satisfy $BaF_2$: 1.0% to 4.5%, $SrF_2$: 2.0% or less, $CaF_2$: 0.45% or less, and $AlF_3$: 0.70% or less in terms of mass % relative to the total mass of the wire.

At least one of the metal elements constituting the fluoride powder and the metal powder is a strong deoxidizing metal element having at least one standard Gibbs energy of formation of −200 to −150 kcal/molO$_2$ at 1500° C. to 1600° C. in an Ellingham diagram of an oxide of the strong deoxidizing metal element.

The contents of an oxide and a carbonate in the flux satisfy oxide: 0.5% or less and carbonate: 0.5% or less in terms of mass % relative to the total mass of the wire.

The mechanisms by which an improved deposition property, which is a feature of the present invention, is achieved by performing welding using the flux-cored wire according to this embodiment and the mechanisms by which burn-through can be prevented and a bead having a suitable shape can be formed by performing welding using the flux-cored wire according to this embodiment even in an overhead welding position are described below.

<Mechanisms (1) by which Deposition Property of Flux-Cored Wire is Enhanced>

The flux-cored wire according to this embodiment is used in straight polarity. In general, it is known that using a welding wire in straight polarity degrades arc stability and makes it impossible to perform welding in a suitable manner. In contrast, using a basic flux-cored wire as disclosed in PTLs 1 and 2 which is designed for use in straight polarity enables a stable arc to be formed even in straight polarity and makes it possible to perform welding in an excellent manner in all welding positions. It is also known that a stable arc can be formed in gas tungsten arc welding (hereinafter, abbreviated as "GTAW"), in which welding is commonly performed in straight polarity using a tungsten electrode as a nonconsumable electrode.

The inventors of the present invention clarified the mechanisms by which a stable arc can be formed and the deposition property can be enhanced even when a flux-cored wire is used in straight polarity, on the basis of the reasons for which GTAW is excellent in terms of arc stability.

First, the mechanisms of GTAW are described below. Since the melting point of tungsten used as an electrode is high (3695 K), the electrode does not melt during welding and is heated to considerably high temperatures in a solid form. It is known that a substance having a high temperature emits thermoelectrons in accordance with the Richardson-Dushmann equation below. Thus, it is considered that the tungsten electrode emits thermoelectrons during welding.

Richardson-Dushmann equation $$Je = A_0 T^2 \exp(-eVw/kT)$$

where Je: density of current caused by thermoelectron emission [A/cm$^2$], $A_0$: Richardson's constant (120.4 [A/cm$^2$·K$^2$]), T: absolute temperature [K], e: elementary electric charge (1.602×10$^{-19}$ [C]), Vw: work function [eV], k: Boltzmann's constant (1.381×10$^{-23}$ [J/K])

A case where, for example, a welding current of 200 A flows is considered below. It is known that a thoriated tungsten electrode, which is broadly used as an electrode for GTAW, has a work function (Vw) of 2.63 eV (see, Ando et al. "Phenomena of welding arc (Expanded edition), Sanpo Publications Inc. (1967)). When an arc is generated within a range of 1.5 mm from the tip of an electrode having a tip angle of 60°, the surface area of an arc generation region is 4.71 mm$^2$. In this case, according to the Richardson-Dushmann equation above, it is estimated that the temperature of the thoriated tungsten electrode changes as illustrated in FIG. 1. According to the above change, when the arc generation region is heated at 2522 K, thermoelectrons are emitted in a stable manner and, consequently, a current of 200 A can be produced. As a result, the arc can be stabilized. Since tungsten has a melting point of 3695 K, the electrode can be maintained in a solid form even at 2522 K, that is, even in the state in which the arc is stabilized. The state of a cathode that feeds a current necessary for discharging by emitting thermoelectrons is referred to as "hot cathode". In the hot cathode, the temperature of the electrode is maintained as a result of the electrode emitting thermoelectrons to lose energy, that is, to be cooled.

In light of the above facts, the flux-cored wire is discussed below.

Constraints are added to the wire sheath of the flux-cored wire depending on the types of the base metal, which is the material to be welded, and the intended joint performance. As a result, in many cases, a steel is used as a material constituting wire sheath. Since the melting point of a steel is about 1770 K, it is not possible to produce the thermoelectrons shown by the Richardson-Dushmann equation in a solid state or at the temperature of a droplet that has not been released from the wire tin when the flux-cored wire has a common composition containing a large amount of titanium oxide. Note that the common composition contains titanium oxide (Vw: 3.87 eV), silicon oxide (Vw: 5.00 eV), iron, an alloying element, and the like.

Accordingly, in the present invention, it is considered that adding a substance that potentially has a low work function to the flux to activate the emission of thermoelectrons enables the flux-cored wire to act as a hot cathode. Examples of the substance that potentially has a low work function include $BaF_2$ (hereinafter, referred to as "barium fluoride"). In a high-temperature environment, fluorine is liberated from barium fluoride. Since barium has a high affinity for oxygen, barium forms barium oxide in the presence of oxygen. It was found that, since barium oxide has a considerably low work function (0.99 eV), the hot-cathode property can be readily achieved.

When the flux-cored wire is melted, the wire sheath and the metal powder included in the flux become molten and readily mix with each other. However, the metal powder does not mix with a compound that stabilizes under a high-temperature environment in the molten zone (hereinafter, this compound is referred to as "stable metal compound"). Examples of the compound that stabilizes under the high-temperature environment include an oxide, a carbide, a sulfide, and a nitride. It is considered an oxide is formed in many cases, like the barium oxide described above, in consideration of affinity. Although stable metal compounds readily mix with one another, a stable metal compound does not mix with a molten metal. Note that the term "molten metal" used herein refers to a single metal or alloy that has been molten.

Accordingly, when the wire is used in straight polarity, a portion of the molten metal zone or stable metal compound zone having a lower work function serves as a cathode spot, at which an arc is generated. The molten metal zone has a relatively high work function since, for example, the work function (Vw) of iron is 4.67 to 4.81 eV and the work function (Vw) of Ni is 5.04 to 5.35 eV (see CRC Handbook of Chemistry and Physics, 78th Edition, CRC Press (1998)). Therefore, the molten metal zone cannot be a stable cathode spot. The stability of straight polarity arc welding highly depends on the properties of the stable metal compound.

As described above, in the case where barium fluoride is added to the flux, barium oxide is formed in the wire molten zone during welding. A highly stable hot cathode can be formed since thermoelectrons are readily emitted because of the barium oxide, which is a stable metal compound. However, it was found that the addition of only barium fluoride results in a strong cooling effect, which reduces the melting rate of the wire.

In light of the above-described findings, the present invention proposes a wire that limits a reduction in the molting rate of the wire by controlling the work function of the stable metal compound serving as a cathode spot and that has excellent arc stability by maintaining a stable hot-cathode property.

The control of the work function of the stable metal compound is described below.

Prior to the explanation of the control of the work function of the stable metal compound, the following assumptions 1. and 2. were made.

1. The surface temperature of droplets in stable MAG (metal active gas) welding is about 2300 K (see, Yamazaki et al. The Surface Temperature Measurement of Weld Pool by Infrared Two-Color Pyrometry, Quarterly Journal of the Japan Welding Society, Vol. 27 (2009)), and this temperature is used as a reference.

2. The area of the arc generation region is the same as the cross-sectional area of the wire.

Then, on the assumption that an arc is discharged from the wire tip, the relationship between the expected work function of the stable metal compound and the corresponding current caused by thermoelectrons at 2300 K was determined using the Richardson-Dushmann equation. The above calculation was done in the range of wire diameter ($\phi$) of 1.0 to 2.0 mm.

Figure 2:
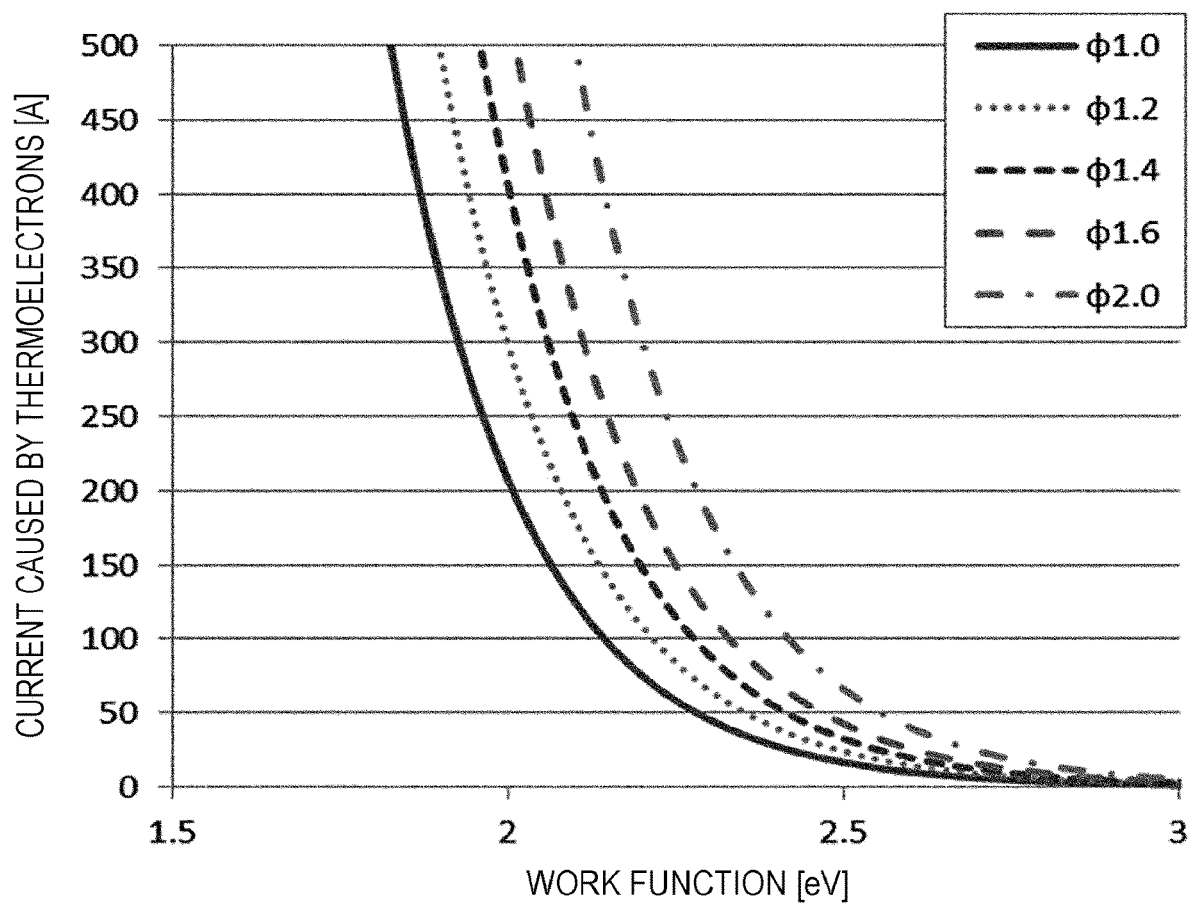
FIG. 2 includes graphs illustrating the relationships between the current caused by thermoelectrons and work function at 2300 K by wire diameter.
Figure 3:
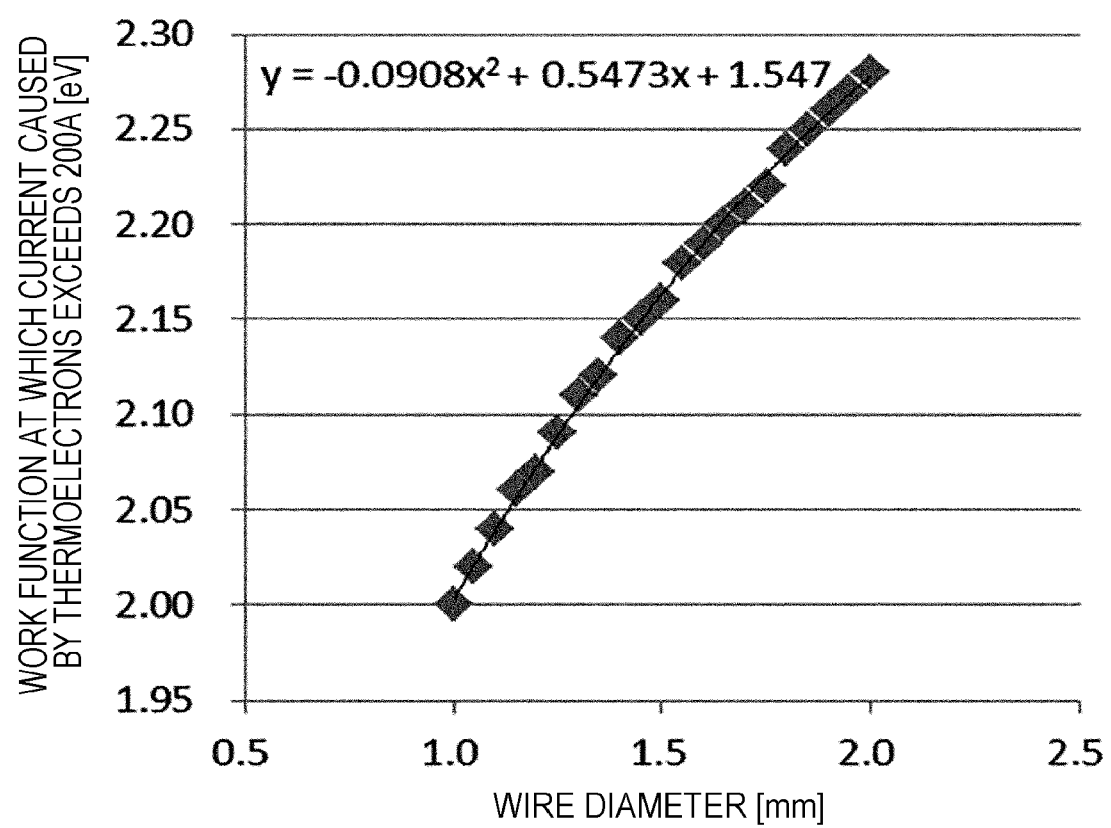
FIG. 3 is a graph illustrating the relationship between wire diameter and the work function at which a consistent hot-cathode property can be achieved.

FIG. 2 illustrates the relationships between work function and current corresponding to representative wire diameters selected from the calculated wire diameters. FIG. 3 is a graph obtained by plotting the work functions at which the current caused by thermoelectrons exceeds 200 A with respect to the wire diameters ($\phi$) on the basis of the calculation results. An approximate quadratic curve is fitted to the plot of FIG. 3 to obtain the right-hand side of the following formula. It is considered that the value of the right-hand side indicates the upper limit for the work function of the stable metal compound at which a stable hot-cathode property can be achieved at a specific wire diameter.

$$y \leq -0.0908x^2 + 0.5473x + 1.547$$

where x: wire diameter, y: the work function of the stable metal compound at which a stable hot-cathode property can be achieved.

In practical welding process, it is difficult to accurately measure the temperature and area of the arc generation region and the work function of the stable metal compound in the arc. Therefore, the composition of the stable metal compound was studied on the basis of test results with reference to the work functions of the oxides considered to be formed from the added stable metal compound.

In addition, it was found that the arc stability can be further enhanced by adding a low-boiling point substance to the flux of the flux-cored wire. The advantageous effects of the low-boiling point substance are described below.

In the droplet transfer of the wire, in general, the force commonly referred to as "electromagnetic pinch force", that is, the force of a substance in which a current flows contracting toward the center of the flow, acts on the molten portion of the wire tip to cause the molten portion to be released from the tip and runs down in the form of a droplet. In contrast, in the flux-cored wire with which a stable arc can be generated in straight polarity as described above, a current flows primarily from the stable metal compound zone. That is, a large current does not flow through the droplet at the wire tip. Therefore, it is necessary to apply a driving force for droplet transfer in a form other than the electromagnetic pinch force. The driving force is an explosive force caused by the gasification of a low-boiling point substance included in the flux.

The low-boiling point substance is required to vaporize in the vicinity of the wire tip and apply an explosive force to the droplet. That is, the boiling point of the low-boiling point substance needs to be lower than the vicinity of 1500° C., which is the melting point of a steel, and is preferably 1300° C. or less.

Examples of the low-boiling point substance include Li, Mg, Zn, and $AlF_3$. When the low-boiling point substance is a metal, the low-boiling point substance may be added in the form of a metal powder such as an Al—Li alloy power or an Al—Mg alloy powder, because the low-boiling point substance is considered to volatilize to a sufficient degree even when used in an alloy form.

Since the explosive force is determined on the basis of the volume of the low-boiling point substance after gasification, the content of the low-boiling point substance is preferably $1.0 \times 10^{-4}$ mol/g or more in terms of amount of substance (mol) relative to the total mass of the wire.

<Mechanisms (2) by which Burn-Through is Prevented and Bead Shape is Stabilized in Overhead Welding>

Arc stability and high-deposition property during welding are maintained and, consequently, a high efficiency can be achieved by the mechanisms (1) above. However, it is difficult to prevent burn-through and achieve a suitable bead shape during welding performed in a difficult welding position in which a molten pool is affected by gravity and, in particular, in an overhead welding position, only by the mechanisms (1). For example, the addition of a large amount of $CaF_2$ increases the deposition speed. That is, the improvement of the wire feed speed is at an acceptable level, and a high deposition property can be achieved. However, it becomes difficult to perform overhead welding in a suitable manner. Specifically, it becomes difficult to prevent burn-through and achieve a suitable bead shape.

Accordingly, in the present invention, it was considered that the state of an oxide film formed until a molten pool present immediately below the arc becomes solidified is a factor in preventing burn-through and maintaining bead shape in the case where a molten pool is affected by gravity. In general, it is considered that the surface tension of a molten pool, that is, a gas-liquid interfacial tension, is a factor in preventing burn-through and maintaining bead shape in overhead welding. However, the gas atmosphere commonly used in arc welding is an activated gas containing $CO_2$ or the like, and the partial pressure of oxygen in such an atmosphere is markedly high. Although the molten pool present immediately below the arc is considered to be controlled by surface tension, it is considered that, after the molten pool has passed the position immediately below the arc, an oxide film is immediately formed on the surface of the molten pool due to the high oxygen partial pressure. Thus, in the present invention, it is considered that the surface tension of not a molten pool but a solid oxide film plays a certain role before the molten pool is completely solidified.

For example, in the case where a large amount of $CaF_2$ is added to the flux, which corresponds to Comparative Example 2 below, Ca, which is an element having a markedly high affinity for oxygen, is present in the arc generation region in the form of a stable oxide and serves as a cathode spot. However, if an excessively large amount of stable oxide is present, it forms aggregates in the molten pool. If the aggregates rise to the surface of the molten pool, they may cause variations in the thickness of the oxide film. As a result, portions of the oxide film having larger thicknesses may remain as island-like slags when solidified and form recesses in the appearance of the bead. Portions of the oxide film having smaller thickness become swollen due to the impact of gravity and may cause burn-through.

As described above, it cannot be said that the compound including a metal element that forms the oxide film is not limited; it is considered that the method for adding the compound to the wire, the affinity of the compound for oxygen, the melting point of an oxide of the metal element, and the like need to be considered.

Since an excessively large amount of stable oxide included in a molten pool adversely affects overhead welding as mentioned above, it is necessary to minimize an oxidation reaction that occurs in the period from when the wire tin is melted to when a molten pool is formed immediately below the arc and control the oxidation reaction such that a uniform oxide film is formed on the surface of the molten pool. Accordingly, the addition of an oxide to the flux is limited. An oxide having a lower affinity needs to be reduced since it serves as an oxygen source and accelerates an increase in the amount of stable oxide. An oxide having a higher affinity needs to be reduced because it directly forms aggregates, which may produce adverse effects.

A carbonate included in the flux also serves as an oxygen source in a droplet and increases the amount of stable oxide. Thus, it is necessary to limit the addition of the carbonate to the wire.

Thus, a metal element that serves as a material constituting an oxide film is added to the flux in the form of a metal powder or a fluoride in order to form a uniform oxide film on the surface of a molten pool. In the addition of the metal element, in order to further increase the above-described high-deposition effect, it is preferable to use at least one of the metal powder and fluoride powder containing a metal element having a lower affinity for oxygen than the metal element included in the fluoride that serves as a cathode spot.

On the other hand, if the affinity of the metal element for oxygen is excessively low, it may take a large amount of time to form the oxide film and, consequently, the appearance of a bead may become degraded. Therefore, the degree of affinity of the metal element for oxygen needs to be further optimized.

On the basis of the above discussions, in the present invention, it was found that the degree of affinity of the metal element for oxygen can be optimized by selecting a metal element having a certain standard Gibbs energy of formation in the range of 1500° C. to 1600° C., in which the surface temperature of the molten pool is considered to fall.

Specifically, various studies were conducted by changing the types and amounts of the fluoride and metal powder used. As a result, it was found that burn-through can be prevented and a suitable bead appearance can be achieved by using a strong deoxidizing metal element having at least one standard Gibbs energy of formation of −200 to −150 $kcal/molO_2$ at 1500° C. to 1600° C. in an Ellingham diagram of an oxide of the strong deoxidizing metal element in the form of a fluoride or a metal powder composed of a single metal or alloy. In the case where the metal element is a transition metal element, various equilibrium states are possible because an oxide of the metal element may have a plurality of valencies. In such a case, it is considered the above condition is satisfied when the standard Gibbs energy of formation of the oxide present in a stable phase falls within the above range.

Examples of the strong deoxidizing metal element that falls within the range of the standard Gibbs energy of formation include Al, Mg, Zr, Ti, Ba, and Sr. In particular, it is preferable to add a strong deoxidizing metal element having a higher affinity, such as Al, Mg, or Zr, to the flux in an adequate amount in the form of a fluoride or a metal powder. This enables overhead welding to be performed in a further suitable manner.

This is presumably because the formation of a uniform oxide film on the surface of a molten pool produces advantageous effects.

<Flux>

Details of the composition of the flux-cored wire according to this embodiment which was conceived in light of the mechanisms (1) and (2) above are described below. In the description of limitations on each component, the ratio (%) of the mass of the component included in the wire, that is, the total mass of the component included in the sheath and the flux, to the total mass of the wire is described unless otherwise specified.

The flux-cored wire according to this embodiment is used for straight polarity gas-shielded arc welding. The flux includes a fluoride powder and a metal powder. The fluoride powder includes $BaF_2$ and at least one selected from the group consisting of $SrF_2$, $AlF_3$, and $CaF_2$. The contents of $BaF_2$, $SrF_2$, $AlF_3$, and $CaF_2$ satisfy $BaF_2$: 1.0% to 4.5%, $SrF_2$: 2.0% or less, $CaF_2$: 0.45% or less, and $AlF_3$: 0.70% or less in terms of mass % relative to the total mass of the wire. At least one of the metal elements constituting the fluoride powder and the metal powder is a strong deoxidizing metal element having at least one standard Gibbs energy of formation of −200 to −150 $kcal/molO_2$ at 1500° C. to 1600° C. in an Ellingham diagram of an oxide of the strong deoxidizing metal element. The contents of an oxide and a carbonate in the flux satisfy oxide: 0.5% or less, and carbonate: 0.5% or less in terms of mass % relative to the total mass of the wire.

Fluoride Powder ($BaF_2$: 1.0% to 4.5%)

$BaF_2$ is a fluoride powder that serves as an essential component of the flux. Limiting the $BaF_2$ content to be 1.0% by mass or more enhances the stability of the cathode spot in straight polarity gas-shielded arc welding. The stabilization of arc reduces the amount of the spatter generated. In order to stabilize arc, the $BaF_2$ content is preferably 1.5% by mass or more.

Limiting the $BaF_2$ content to be 4.5% by mass or less prevents an excessive reduction in the work function in the wire molten zone and enables high-deposition performance to be maintained. In order to further enhance the high-deposition performance, the $BaF_2$ content is preferably 4.0% by mass or less.

($SrF_2$: 2.0% or Less, $CaF_2$: 0.45% or Less, and $AlF_3$: 0.70% or Less)

The flux includes at least one selected from the group consisting of $SrF_2$, $CaF_2$, and $AlF_3$ as a fluoride powder. Adding the above fluoride powders in addition to $BaF_2$ enables the work function in the wire molten zone to be controlled and thereby increases the amount of deposition. However, if the content of the above fluoride powders is excessively high, the above work function may be excessively increased and, consequently, the arc may become unstable. Accordingly, the contents of the above fluoride powders are limited as follows: $SrF_2$: 2.0% or less, $CaF_2$: 0.45% or less, and $AlF_3$: 0.70% or less.

The $SrF_2$ content is preferably 1.50% or less and is more preferably 1.30% or less. The $CaF_2$ content is preferably 0.35% or less. The $AlF_3$ content is preferably 0.50% or less.

Since it is necessary that the flux include one or more fluoride powders selected from $SrF_2$, $CaF_2$, and $AlF_3$, the lower limits for the contents of the above fluoride powders are not specified. The contents of the above fluoride powders preferably satisfy the relationship represented by the following formula.

$$0.5 \le SrF_2(\%) + 10.1 \times CaF_2(\%) + 2.3 \times AlF_3(\%)$$

In order to further increase the high-deposition effect, the right-hand side of the above inequality is preferably 0.5 or more and is more preferably 0.7 or more. In order to maintain certain welding performance, such as generation of spatter, and suitable overhead weldability, the right-hand side is preferably 5.0 or less.

The total content of $BaF_2$, $SrF_2$, $CaF_2$, and $AlF_3$ is preferably more than 2% and is more preferably 2.5% or more in terms of mass % relative to the total mass of the wire in order to stabilize the cathode spot. The above total content is preferably 5% or less and is more preferably 4.0% or less in order to prevent generation of an excessive amount of fluorine and thereby further stabilize droplet transfer.

The flux may include a fluoride powder other than $BaF_2$, $SrF_2$, $CaF_2$, or $AlF_3$. Examples of the other fluoride powder include LiF, NaF, $MgF_2$, and $K_2SiF_6$.

The total content of the fluoride powders is preferably more than 2% in terms of mass % relative to the total mass of the wire in order to stabilize the cathode spot and is more preferably 3.5% or more in terms of mass % relative to the total mass of the wire in order to accelerate the release of a droplet. The total content of the fluoride powders is preferably 6% or less, is more preferably 5% or less, and is further preferably 4.5% or less in order to prevent generation of an excessive amount of fluorine and thereby further stabilize droplet transfer.

The ratio of the total content of the $BaF_2$, $SrF_2$, $CaF_2$, and $AlF_3$ to the total content of the fluoride powders (($BaF_2 + SrF_2 + CaF_2 + AlF_3$)/Total of fluoride powders) is preferably 0.5 or more and is more preferably 0.6% or more in order to stabilize the cathode spot. The upper limit for the above ratio is 1. In other words, the other fluoride powders are not necessarily included in the flux.

Metal Powder

The metal powder included in the flux may be either a metal powder composed of a single metal or a metal powder composed of an alloy.

Examples of the metal element constituting the metal powder include Al, Mg, Zr, Mn, Si, Ni, Cr, and Fe. In particular, it is preferable that the flux include a metal powder composed of at least one element selected from Al, Mg, and Zr. Examples of the form of the alloy include, but are not limited to, Fe—Al, Al—Mg, Fe—Mn, and Fe—Si—Mn.

When used in the form of a metal powder, all of Al, Mg, and Zr serve as a strong deoxidizing agent, reduce the oxygen content in the molten metal to increase the surface tension of the molten metal, and cause a uniform oxide film to be formed on the surface of a molten pool. This enables a suitable bead shape to be achieved in spite of the impact of gravity that acts in all welding positions.

Examples of other metal powders include Mn, Si, Ni, and Cr, which maintain the mechanical properties of a weld metal, such as strength and toughness, at certain levels.

Strong Deoxidizing Metal Element

At least one of the metal elements constituting the fluoride powder and the metal powder is a strong deoxidizing metal element having at least one standard Gibbs energy of formation of −200 to −150 kcal/$molO_2$ at 1500° C. to 1600° C. in an Ellingham diagram of an oxide of the strong deoxidizing metal element. At least one of the standard Gibbs energies of formation of the strong deoxidizing metal element is preferably −180 kcal·$mol^{-1}$ or more and is preferably −160 kcal/$molO_2$ or less.

Examples of such a strong deoxidizing metal element include Al, Mg, Zr, Ti, Ba, and Sr. In particular, at least one strong deoxidizing metal element selected from the group consisting of Al, Mg, and Zr is more preferably included in the flux.

Al, Mg, and Zr may be included in the flux in the form of either a fluoride powder or a metal powder and may be included in the flux in the form of both fluoride powder and metal powder. The metal powder may be composed of a single metal or an alloy.

The Al content is preferably $12 \times 10^{-4}$ mol/g or less and is more preferably $11 \times 10^{-4}$ mol/g or less in terms of amount of substance relative to the total mass of the wire in order to achieve a suitable bead shape while maintaining high-deposition property. Al is not necessarily included in the flux. Note that the term "Al content" used herein refers to the total content of Al included in the form of a fluoride powder and Al included in the form of a metal powder. The same applies to Mg and Zr below.

For the same reasons as above, the Mg content is preferably $5 \times 10^{-4}$ mol/g or less and is more preferably $3 \times 10^{-4}$ mol/g or less in terms of amount of substance relative to the total mass of the wire. Mg is not necessarily included in the flux.

For the same reasons as above, the Zr content is preferably $5 \times 10^{-4}$ mol/g or less and is more preferably $3 \times 10^{-4}$ mol/g or less in terms of amount of substance relative to the total mass of the wire. Zr is not necessarily included in the flux.

The total content of Al, Mg, and Zr (Al+Mg+Zr) is preferably $8 \times 10^{-4}$ mol/g or more and is more preferably $10 \times 10^{-4}$ mol/g or more; and is preferably $15 \times 10^{-4}$ mol/g or less and is more preferably $13 \times 10^{-4}$ mol/g or less in terms of amount of substance relative to the total mass of the wire.

In the case where the flux includes a metal powder composed of Mg as a strong deoxidizing metal element, the total content of Mg included in the metal powder containing Mg and $AlF_3$ used as a fluoride powder preferably satisfies the relationship represented by the following formula in terms of amount of substance relative to the total mass of the wire. Note that the metal powder containing Mg is a metal powder composed of a single metal or a metal powder composed of an alloy.

$$1.0 \times 10^{-4} \leq Mg\ (mol/g) + AlF_3\ (mol/g) \leq 5.0 \times 10^{-4}$$

The above total content is more preferably $2.0 \times 10^{-4}$ or more and is more preferably $4.0 \times 10^{-4}$ or less.

Other Components

Components other than the above components may be added to the flux in amounts with which the advantageous effects of the present invention are not impaired.

However, if an excessive amount of oxide is present in the flux, the formation of an uniform oxide film on the surface of a molten pool in the present invention may be blocked. This results in degradation of appearance of a bead formed by overhead welding. Accordingly, the total oxide content is limited to be 0.5% by mass or less of the total mass of the wire. The total oxide content is preferably 0.2% by mass or less and is more preferably 0.1% by mass or loss.

In general, a carbonate generates carbon dioxide and forms a metal oxide when heated. Thus, the appearance of a bead may become degraded as in the case where an oxide is added to the flux. Addition of an excessive amount of carbonate results in generation of an excessive amount of carbon dioxide, which adversely affects the welding performance. Accordingly, the total carbonate content is limited to be 0.5% by mass or loss of the total mass of the wire. The total carbonato content is preferably 0.2% by mass or less and is more preferably 0.1% by mass or less.

The ratio of the flux content to the total mass of the wire (hereinafter, this ratio is referred to as "flux filling ratio") is preferably 10% by mass or more in consideration of ease of production. The ratio of the flux content is preferably 20% by mass or less in order to enhance the arc stability.

<Optional Components>

Optional components that may be included in the wire according to this embodiment are added to the flux or the sheath in the form of a pure metal, an alloy, or a compound, such as an oxide, a carbide, or a nitride.

The optional components may include predetermined amounts of C, Si, Mn, Ni, Mo, W, Nb, V, Cr, Ti, N, S, P, B, Cu, Ta, REMs (rare-earth elements), and the like in accordance with the required mechanical performance of a weld metal and the conditions under which welding is done. The optional components may include an alkali metal or a compound of an alkali metal as needed.

In the case where an iron-base material is to be used, the balance preferably includes Fe and inevitable impurities.

The contents of the optional components of a flux-cored wire for mild steel, high-tensile steel, low-temperature service steel, weather-resistant steel, and the like preferably further satisfy, for example, the following: C: 0.5% or less, Si: 2.0% or less, Mn: 3.0% or less, Ni: 5.0% or less, Mo: 3.0% or less, W: 3.0% or less, Nb: 3.0% or less, V: 3.0% or less, Cr: 5.0% or less, Ti: 3.0% or less, N: 0.05% or less, S: 0.05% or less, P: 0.05% or less, B: 0.05% or less, Cu: 2.0% or less, Ta: 3.0% or less, and REM: 0.1% or less, in terms of mass fraction relative to the total mass of the wire. Note that the above elements are not necessarily included in the wire.

In addition to the above components, the flux-cored wire may further include one or a plurality of metal powders and metal compounds including an alkali metal element. In such a case, the alkali metal element serves as an arc stabilizer. Examples of the alkali metal element include K, Li, and Na. The total content of the metal powder and the metal compound including the alkali metal element is preferably 3% by mass or loss and is more preferably 2% by mass or loss of the total mass of the wire. The balance preferably includes Fe and impurities.

The contents of the above optional components may be the same as the composition commonly used for flux-cored wires for iron-base alloy or mild steel conforming to JIS Z 3313:2009, high-tensile steel or low-temperature service steel, or weather resistant stool described in JIS Z 3320: 2012.

A specific preferable aspect is described below. Note that the following elements are not necessarily included in the wire.

C is a component that affects the strength of a weld metal; the higher the C content, the higher the strength. The C content is preferably 0.5% or less and is more preferably 0.2% or less in consideration of the range of the strength required for the popular types of steel, such as a mild steel, a high-tensile steel, and a low-temperature service steel. The C content is preferably 0.001% or more in order to adjust strength.

Si is a component that affects the strength and toughness of a weld metal. The Si content is preferably 2.0% or less and is more preferably 1.2% or less in order to satisfy a certain range of the mechanical performance required for the popular types of steel, such as a mild steel, a high-tensile steel, and a low-temperature service steel. The Si content is preferably 0.1% or more.

Mn is a component that affects the strength and toughness of a weld metal similarly to Si. The Mn content is preferably 3.0% or less and is more preferably 2.5% or less in order to satisfy a certain range of the mechanical performance required for the popular types of steel, such as a mild steel, a high-tensile steel, and a low-temperature service steel. The Mn content is preferably 0.5% or more.

Ni is a component that stabilizes the austenite microstructure of a weld metal and enhances toughness at low temperatures. Ni is also a component capable of adjusting the amount of ferrite microstructure crystallized. The Ni content is preferably 5.0% or less and is more preferably 3.0% or less. In the case where the flux-cored wire is used for low-temperature service steel or the like, the Ni content is preferably 0.20% or more.

Mo is a component that increases high-temperature strength and enhances pit corrosion resistance. The Mo content is preferably 3.0% or less and is more preferably 2.0% or less in order to satisfy a certain range of the mechanical performance required for the popular types of steel, such as a mild steel, a high-tensile steel, and a low-temperature service steel. In the case where the flux-cored wire is used for high-tensile steel, heat-resistant steel, or the like, the Mo content is preferably 0.10% or more.

W is a component that increases high-temperature strength and enhances pit corrosion resistance. The W content is preferably 3.0% or less and is more preferably 2.0% or less in consideration of the range of the mechanical performance required for the popular types of steel, such as a mild steel, a high-tensile steel, and a low-temperature service steel.

Nb is a component that affects mechanical performance, such as strength. The Nb content is preferably 3.0% or less and is more preferably 2.0% or less in order to satisfy a certain range of the mechanical performance required for the popular types of steel, such as a mild steel, a high-tensile steel, and a low-temperature service steel.

V degrades the toughness and cracking resistance of a weld metal while increasing the strength of the weld metal. Accordingly, the V content is preferably 3.0% or less and is more preferably 2.0% or less.

Cr is a component that affects the mechanical performance of a weld metal, such as strength. The Cr content is preferably 5.0% or less and is more preferably 3.0% or less in order to satisfy a certain range of the mechanical performance required for the popular types of steel, such as a mild steel, a high-tensile steel, and a low-temperature service steel. In the case where the flux-cored wire is used for heat-resistant steel or the like, the Cr content is preferably 0.10% or more.

Ti bonds with C or N to reduce the size of crystal grains. Thus, Ti is a component that primarily enhances the toughness of a weld metal. The Ti content is preferably 3.0% or less and is more preferably 1.0% or less in order to enhance toughness in the case where a popular type of steel, such as a mild steel, a high-tensile steel, or a low-temperature service steel, is used. The Ti content is preferably 0.01% or more.

N is a component dissolved in the crystal structure in the form of an interstitial solid solution to increase strength. However, since N may cause porosity defects, such as blowholes and pits, to be formed in a weld metal, N is not aggressively added to the wire unless a particularly high strength is needed. The N content is preferably 0.05% or less and is more preferably 0.03% or less. The N content is preferably 0.0010% or more.

S is an element that reduces the viscosity and surface tension of a droplet formed when the wire is melted to facilitate droplet transfer, thereby reduces the size of spatter particles, and consequently enhances welding performance. On the other hand, S degrades cracking resistance. Accordingly, the S content is preferably 0.05% or less and is more preferably 0.03% or less. The S content is preferably 0.0010% or more.

P degrades cracking resistance and the mechanical properties of a weld metal. Therefore, the P content is preferably limited to be 0.05% or loss and is more preferably 0.03% or loss.

B degrades the cracking resistance of a weld metal while limiting the toughness degradation caused by nitrogen included in the weld metal. Therefore, the B content is preferably 0.05% or less and is more preferably 0.03% or less. The B content is preferably 0.0005% or more in order to maintain certain toughness.

Cu increases the strength and weather resistance of a weld metal. The Cu content is preferably 2.0% or less and is more preferably 1.0% or less in order to achieve certain ranges of strength and weather resistance required for the popular types of steel, such as a mild steel, a high-tensile steel, and a low-temperature service steel. The Cu content is preferably 0.01% or more in order to maintain the strength and weather resistance of a weld metal at certain levels.

Ta is a component that affects mechanical performance, such as strength. The Ta content is preferably 3.0% or less and is more preferably 2.0% or less in order to satisfy a certain range of the mechanical performance required for the popular types of steel, such as a mild steel, a high-tensile steel, and a low-temperature service steel.

Examples of REMs, which stands for rare-earth elements, include Ce and La. REMs have a high affinity for S, suppress S from segregating at grain boundaries, and reduce the occurrence of hot cracking caused by S. Therefore, the total REM content is preferably 0.1% or less and is more preferably 0.05% or less in order to further stabilize arc.

The balance is preferably Fe and impurities.

The content of Fe included as a balance is preferably 80% by mass or more and 98% by mass or less.

The term "impurities" used herein refers to elements that are not added intentionally. Examples of the impurities other than the above-described elements include Sn, Co, Sb, and As. In the case where these elements are included in the form of an oxide, the balance further includes O. The total content of the impurities is preferably 0.5% by mass or less and is more preferably 0.3% by mass or less.

The contents of the alloy components of a flux-cored wire for stainless steel and the like preferably further satisfy, for example, the following: C: 0.5% or less, Si: 2.0% or less, Mn: 3.0% or less, Ni: 5.0% to 20.0%, Mo: 5.0% or less, W: 3.0% or less, Nb: 3.0% or less, V: 3.0% or less, Cr: 15.0% to 30.0%, Ti: 3.0% or less, N: 0.50% or less, S: 0.05% or less, P: 0.05% or less, B: 0.05% or less, Cu: 2.0% or less, Ta: 3.0% or less, and REM: 0.1% or less, in terms of mass fraction relative to the total mass of the wire. Note that the above elements are not necessarily included in the wire.

In addition to the above components, the flux-cored wire may further include one or a plurality of metal powders and metal compounds including an alkali metal element.

In such a case, the alkali metal element serves as an arc stabilizer. Examples of the alkali metal element include K, Li, and Na. The total content of the metal powder and the metal compound including the alkali metal element is preferably 3% by mass or less and is more preferably 2% by mass or loss of the total mass of the wire.

The contents of the above alloy components may be the same as the composition commonly used for flux-cored wires for iron-base alloy or stainless steel confirming to JIS Z 3323:2007.

The composition according to a specific preferable aspect is the same as the contents of the above-described alloy components of a flux-cored wire for mild steel, high-tensile steel, low-temperature service steel, weather-resistant steel, and the like, except Ni, Cr, Mo, Nb, and N.

Ni is a component that stabilizes the austenite microstructure of a weld metal and enhances toughness at low temperatures. Ni is also a component added to the flux in a certain amount in order to adjust the amount of ferrite microstructure crystallized. In consideration of the balance between the above properties, the Ni content may be set to fall within the range of the Ni content which is commonly applied to a stainless steel. The Ni content is preferably 5.0% or more and is more preferably 9.0% or more. The Ni content is preferably 20% or less and is more preferably 16% or less.

Cr is a component that enhances the corrosion resistance of a weld metal. However, Cr is also a component that reacts with an oxidizing shielding gas to form a oxide and adversely affects the balance between the components of slag when added in an amount more than necessary. In consideration of the balance between the above properties, the Cr content may be set to fall within the range of the Cr content which is commonly applied to a stainless steel. The Cr content is preferably 15% or more and is more preferably 17% or more. The Cr content is preferably 30% or less and is more preferably 25% or less.

Mo is a component that enhances corrosion resistance and, in particular, pit corrosion resistance but is rare and uneconomical. In consideration of the balance between the above properties, the Mo content may be set to fall within the range of the Mo content which is commonly applied to a stainless steel. The Mo content is preferably 5.0% or less and is more preferably 4.0% or less.

Nb is a component that is fixed by being bonded with C, thereby limits the degradation of corrosion resistance caused by formation of Cr carbide, that is, sensitization, and consequently enhances corrosion resistance. On the other hand, Nb degrades cracking resistance. Accordingly, the Nb content is preferably 3.0% or less and is more preferably 2.0% or less. In the case where the flux-cored wire is used for sensitization-resistant steel or the like, the Nb content is preferably 0.2% or more.

N is a component that, for example, stabilizes the austenite microstructure of a weld metal, increases the strength of the weld metal, and enhances pit corrosion resistance. On the other hand, N causes porosity defects. In consideration of the balance between the above properties, the N content is preferably 0.5% or less and is more preferably 0.4% or less. In the case where the flux-cored wire is used for high corrosion-resistant steel, cryogenic-temperature service steel, or the like, the N content is preferably 0.1% or more.

Examples of the material constituting the sheath of the flux-cored wire include, but are not limited to, common steel, SUH409L (JIS G 4312:2019), SUS430, SUS304L, SUS316L, SUS310S (all the above: JIS G 4305:2012).

In the flux-cored wire, if the amount of flux is small compared with the internal gap formed by the sheath, it becomes difficult to form a flux column during welding. Furthermore, the flux may move inside the wire. In such a case, the flux content in the wire may vary in the longitudinal direction of the wire depending on the vibration of a wire manufacturing line and the like and inconsistencies in the quality of the wire may occur. Accordingly, the flux content in the wire is preferably 10% or more and is more preferably 11% or more in terms of mass fraction relative to the total mass of the wire.

On the other hand, when a large amount of flux is sheathed with a small amount of sheath, a sheath material having a small wall thickness may be used. However, if the thickness of the sheath material is extremely small, the sheath material may be broken and the wire may rupture in a wire drawing step. Accordingly, the flux content in the wire (hereinafter, referred to simply as "flux content") is preferably 20% or less and is more preferably 18% or less.

The wire diameter of the flux-cored wire is not limited. The diameter of the wire is preferably 0.9 to 2.0 mm and is more preferably 1.2 mm or more and 1.6 mm or less in consideration of the combination of the wire with a common welding device and welding performance.

The cross-sectional shape of the wire is not limited. The present invention may be applied to a wire having a seam formed in the sheath, a seamless wire that does not have the seam, or the like. When the flux-cored wire is a seamless wire, the surface of the wire may be plated with Cu or the like.

<<Production Method>>

The flux-cored wire according to this embodiment can be produced by the same method as in the related art. The production method is not limited. For example, the flux is charged inside of the sheath. In this step, the composition of the sheath and the composition and content of the flux are adjusted appropriately so as to fall within the above-described ranges. Then, the wire constituted by the sheath and the flux charged inside of the sheath is rolled or drawn in order to reduce the diameter of the wire. Hereby, a flux-cored wire having a predetermined outside diameter can be formed.

<<Welding Method>>

The welding method according to this embodiment is gas-shielded arc welding in which the flux-cored wire having a straight polarity and a shielding gas are used.

The shielding gas is not limited and may be a single shielding gas including only one component or a mixed gas including two or more components. For example, the shielding gas preferably includes a $CO_2$ gas that serves as an activity gas component at a proportion of 60% by volume or more. It is also preferable that the shielding gas include an Ar gas that serves as an inert gas component at a proportion of 60% by volume or more.

When welding is performed, furthermore, welding current, welding voltage, welding speed, welding position, flow rate of the shielding gas, etc. are adjusted as needed and determined. Since the flux-cored wire according to this embodiment enables excellent high-deposition performance without causing bead shape failure, such as burn-through, overlap, and undercut, even when welding is performed in a position susceptible to the impact of gravity, such as a vertical position or an overhead position, the efficiency of welding operation can be increased.

<<Weld Metal>>

The weld metal according to this embodiment is formed by performing welding using the above-described flux-cored wire. The base metal that is to be welded may be selected from common steels, such as a mild steel, a high-tensile steel, a low-temperature service steel, and a stainless steel.

Although it is not possible to uniformly define the composition of the weld metal formed by welding because it varies with the compositions of the base metal and the wire and welding conditions, such as the type of the shielding gas used, a weld metal having a suitable bead shape can be formed.

EXAMPLES

The present invention is described further specifically with reference to Examples below. Note that the present invention is not limited by Examples. The present invention can be implemented in various modifications without departing from the scope of the present invention, and they are all included in the technical scope of the present invention.

Evaluation Methods (Evaluations of High-Deposition Property and Availability of Overhead Welding)

Welding was performed under the following welding conditions. In the evaluation of high-deposition property, the speed at which the wire was fed during welding was measured. In the evaluation of the availability of overhead welding, the availability of overhead welding was determined.

In the evaluation of the wire feed speed, the wire feed speed (m/min) measured using the flux-cored wire prepared in Comparative Example 1 was used as a reference. When the improvement ratio is 10% or more, it is considered that the wire has high-deposition performance. Note that the improvement ratio is an increase ratio relative to the wire feed speed measured in Comparative Example 1.

In the evaluation of the availability of overhead welding, whether or not burn-through or humping occurred in a weld bead having a size of about 200 mm was determined. When neither burn-through nor humping occurred, an evaluation of Passed was given as "Yes: the weld bead has a suitable shape". When at least one of the burn-through and humping occurred, an evaluation of Failed was given as "No". Note that burn-through is a phenomenon in which a weld metal runs down and drops due to gravity. Humping is a phenomenon in which fluctuations in the bead height in the longitudinal direction of welding are increased as a result of a weld metal being affected by a force such as the gravitational force, are pressure, or surface tension.

(Welding Conditions)
Welding current: 240 A
Welding voltage: adequate (20 to 23 V)
Welding speed: 15 cm minute
Welding position: Overhead, bead-on-plate
Tip-base metal distance: 15 mm
Weaving width: 8 mm
Weaving frequency: 1.2 Hz
Shielding gas: $CO_2$ gas, 100%
Gas flow rate: 25 L/min
Base metal: SM490A (rolled steel material for welding structure)

Examples 1 to 13 and Comparative Examples 1 and 2

A weld testing was conducted using a specific one of the flux-cored wires having the compositions described in Tables 1 and 2 in the above-described manner (welding conditions). As for the composition of the flux, neither oxide nor carbonate was aggressively added to the flux used in Examples 1 to 13. In each of the flux-cored wires, the contents of oxide and carbonate in the flux were all 0.5% or less of the total mass of the wire.

TABLE 1

| | | Example | | | | | | | |
|---|---|---|---|---|---|---|---|---|---|
| | | 1 | 2 | 3 | 4 | 5 | 6 | 7 | 8 |
| Type of material for wire sheath | | Mild steel | Mild steel | Mild steel | Mild steel | Mild steel | Mild steel | Mild steel | Mild steel |
| Wire diameter [mm] | | 1.4 | 1.4 | 1.4 | 1.4 | 1.4 | 1.4 | 1.4 | 1.4 |
| Flux content [%] | | 13 | 13 | 13 | 13 | 13 | 13 | 13 | 13 |
| Flux composition Content relative to total mass of wire [%] | $CaF_2$ | 0.34 | 0.20 | 0.10 | 0 | 0.20 | 0.10 | 0.24 | 0.09 |
| | $BaF_2$ | 2.8 | 2.7 | 2.9 | 3.1 | 3.1 | 3.3 | 3.7 | 3.0 |
| | $SrF_2$ | 0 | 0 | 0 | 0 | 0 | 0 | 0 | 0 |
| | $AlF_3$ | 0.34 | 0.49 | 0.41 | 0.34 | 0.15 | 0.07 | 0.17 | 0.06 |
| | Fe | 91.3 | 91.3 | 91.3 | 91.3 | 91.3 | 91.3 | 90.7 | 91.7 |
| | Al (metal) | 2.3 | 2.3 | 2.3 | 2.3 | 2.3 | 2.3 | 2.3 | 2.3 |
| | Mg (metal) | 0.7 | 0.7 | 0.7 | 0.7 | 0.7 | 0.7 | 0.7 | 0.7 |
| | Zr (metal) | 0.1 | 0.1 | 0.1 | 0.1 | 0.1 | 0.1 | 0.1 | 0.1 |
| | Other metal elements | 2.1 | 2.1 | 2.1 | 2.1 | 2.1 | 2.1 | 2.1 | 2.1 |
| | Other impurities | Balance | Balance | Balance | Balance | Balance | Balance | Balance | Balance |
| $SrF_2 + 10.1 \times CaF_2 + 2.3 \times AlF_3$ [%] | | 4.2 | 3.2 | 2.0 | 0.8 | 2.4 | 1.2 | 2.8 | 1.0 |
| Amount of substance of metal element constituting fluoride, relative to total mass of wire × $10^{-4}$ [mol/g] | Ba | 1.6 | 1.6 | 1.7 | 1.8 | 1.8 | 1.9 | 2.1 | 1.7 |
| | Ca | 0.44 | 0.26 | 0.13 | 0 | 0.26 | 0.13 | 0.31 | 0.11 |
| | Sr | 0 | 0 | 0 | 0 | 0 | 0 | 0 | 0 |
| | Al | 0.40 | 0.58 | 0.49 | 0.40 | 0.18 | 0.09 | 0.21 | 0.07 |
| Amount of substance included as powder of single metal or alloy, relative to total mass of wire × $10^{-4}$ [mol/g] | Al (metal) | 8.4 | 8.4 | 8.4 | 8.4 | 8.4 | 8.4 | 8.4 | 8.4 |
| | Mg (metal) | 2.7 | 2.7 | 2.7 | 2.7 | 2.7 | 2.7 | 2.7 | 2.7 |
| | Zr (metal) | 0.1 | 0.1 | 0.1 | 0.1 | 0.1 | 0.1 | 0.1 | 0.1 |
| Mg (metal) + $AlF_3$ [mol/g] | | 3.1 | 3.3 | 3.2 | 3.1 | 2.9 | 2.8 | 2.9 | 2.8 |
| Wire feed speed [m/min] | | 4.77 | 4.57 | 4.57 | 4.66 | 4.66 | 4.53 | 4.66 | 4.53 |
| Availability of overhead welding | | Yes | Yes | Yes | Yes | Yes | Yes | Yes | Yes |
| Improvement of wire feed speed compared with Comparative example 1 [%] | | 17.5 | 12.6 | 12.6 | 14.8 | 14.8 | 11.6 | 14.8 | 11.6 |

TABLE 2

| | | Example | | | | | Comparative example | |
|---|---|---|---|---|---|---|---|---|
| | | 9 | 10 | 11 | 12 | 13 | 1 | 2 |
| Type of material for wire sheath | | Mild steel | Mild steel | Mild steel | Mild steel | Mild steel | Mild steel | Mild steel |
| Wire diameter [mm] | | 1.4 | 1.4 | 1.4 | 1.4 | 1.4 | 1.4 | 1.4 |
| Flux content [%] | | 13 | 13 | 18 | 13 | 13 | 13 | 13 |
| Flux composition Content relative to total mass of wire [%] | $CaF_2$ | 0.10 | 0.10 | 0.10 | 0 | 0 | 0 | 0.48 |
| | $BaF_2$ | 3.3 | 3.3 | 3.3 | 1.8 | 1.3 | 2.7 | 2.5 |
| | $SrF_2$ | 0 | 0 | 0 | 0.9 | 1.3 | 0 | 0 |
| | $AlF_3$ | 0.07 | 0.07 | 0.07 | 0 | 0 | 0 | 0.46 |
| | Fe | 91.2 | 90.9 | 91.3 | 93.0 | 93.0 | 92.1 | 91.3 |
| | Al (metal) | 2.4 | 2.4 | 2.3 | 2.3 | 2.3 | 2.3 | 2.3 |
| | Mg (metal) | 0.7 | 0.8 | 0.7 | 0.6 | 0.6 | 0.7 | 0.7 |

TABLE 2-continued

|  |  | Example | | | | | Comparative example | |
|---|---|---|---|---|---|---|---|---|
|  |  | 9 | 10 | 11 | 12 | 13 | 1 | 2 |
|  | Zr (metal) | 0.1 | 0.2 | 0.1 | 0.1 | 0.1 | 0.1 | 0.1 |
|  | Other metal elements | 2.1 | 2.2 | 2.1 | 1.3 | 1.3 | 2.1 | 2.1 |
|  | Other impurities | Balance | Balance | Balance | Balance | Balance | Balance | Balance |
| $SrF_2 + 10.1 \times CaF_2 + 2.3 \times AlF_3$ [%] |  | 1.2 | 1.2 | 1.2 | 0.9 | 1.3 | 0.0 | 5.9 |
| Amount of substance of | Ba | 1.9 | 1.9 | 1.9 | 1.0 | 0.8 | 1.5 | 1.4 |
| metal element constituting | Ca | 0.13 | 0.13 | 0.13 | 0 | 0 | 0 | 0.61 |
| fluoride, relative to total | Sr | 0 | 0 | 0 | 0.69 | 1.07 | 0 | 0 |
| mass of wire × $10^{-4}$ [mol/g] | Al | 0.09 | 0.09 | 0.08 | 0 | 0 | 0 | 0.55 |
| Amount of substance | Al (metal) | 9.1 | 8.7 | 8.4 | 8.4 | 8.4 | 8.4 | 8.4 |
| included as powder of single | Mg (metal) | 2.7 | 3.2 | 2.7 | 2.6 | 2.6 | 2.7 | 2.7 |
| metal or alloy, relative to | Zr (metal) | 0.1 | 0.2 | 0.1 | 0.1 | 0.1 | 0.1 | 0.1 |
| total mass of wire × $10^{-4}$ [mol/g] |  |  |  |  |  |  |  |  |
| Mg (metal) + $AlF_3$ [mol/g] |  | 2.8 | 3.3 | 2.8 | 2.6 | 2.6 | 2.7 | 3.2 |
| Wire feed speed [m/min] |  | 4.49 | 4.53 | 4.79 | 4.41 | 4.56 | 4.06 | 5.17 |
| Availability of overhead welding |  | Yes | Yes | Yes | Yes | Yes | Yes | No |
| Improvement of wire feed speed compared with Comparative example 1 [%] |  | 10.6 | 11.6 | 18.0 | 8.6 | 12.3 | — | 27.3 |

Compared with the flux-cored wire prepared in Comparative Example 1 that included a flux including only $BaF_2$ as a fluoride powder, when the flux further included one or more fluorides selected from the group consisting of $SrF_2$, $AlF_3$, and $CaF_2$ as a fluoride powder, the wire feed speed was markedly increased and excellent deposition property was achieved.

Moreover, when the composition of the fluoride powder was set appropriately, the occurrence of burn-through and humping was reduced and a suitable bead shape was achieved even in overhead welding performed at a welding current of 240 A.

While details of the present invention are described with reference to specific embodiments, it is apparent to those skilled in the art that various modifications can be made without departing from the spirit and the scope of the present invention. This application is based on Japanese Patent Application (Japanese Patent Application No. 2019-089013) filed May 9, 2019, which is hereby incorporated by reference herein in its entirety.

The invention claimed is:

1. A flux-cored wire for straight polarity gas-shielded arc welding,
    the flux-cored wire comprising a flux comprising a fluoride powder and a metal powder,
    wherein the fluoride powder comprises $BaF_2$ and at least one selected from the group consisting of $SrF_2$, $AlF_3$, and $CaF_2$,
    wherein contents of the $BaF_2$, the $SrF_2$, the $AlF_3$, and the $CaF_2$ satisfy, in terms of mass % relative to a total mass of the wire,
    $BaF_2$: 1.0% to 4.5%,
    $SrF_2$: 2.0% or less,
    $CaF_2$: 0.45% or less, and
    $AlF_3$: 0.70% or less,
    wherein at least one of a metal element constituting the fluoride powder and a metal element constituting the metal powder is a strong deoxidizing metal element having at least one standard Gibbs energy of formation of −200 to −150 kcal/molO$_2$ at 1500° C. to 1600° C. in an Ellingham diagram of an oxide of the strong deoxidizing metal element, and
    wherein contents of an oxide and a carbonate in the flux satisfy, in terms of mass % relative to the total mass of the wire,
    oxide: 0.5% or less, and
    carbonate: 0.5% or less.

2. The flux-cored wire according to claim 1, wherein the contents of the $SrF_2$, the $AlF_3$, and the $CaF_2$ in the fluoride powder satisfy a relationship below in terms of mass % relative to the total mass of the wire:

$$0.5 \leq SrF_2(\%) + 10.1 \times CaF_2(\%) + 2.3 \times AlF_3(\%).$$

3. The flux-cored wire according to claim 1, wherein the strong deoxidizing metal element is at least one element selected from the group consisting of Al, Mg, and Zr, and
    wherein contents of the Al, the Mg, and the Zr satisfy, in terms of amount of substance relative to the total mass of the wire,
    Al: $12 \times 10^{-4}$ mol/g or less,
    Mg: $5 \times 10^{-4}$ mol/g or less,
    Zr: $5 \times 10^{-4}$ mol/g or less, and
    (Al+Mg+Zr): $8 \times 10^{-4}$ to $15 \times 10^{-4}$ mol/g.

4. The flux-cored wire according to claim 1, wherein a content of the flux is 10% to 20% in terms of mass % relative to the total mass of the wire.

5. The flux-cored wire according to claim 1, wherein a total content of the fluoride powder is more than 2% and 6% or less in terms of mass % relative to the total mass of the wire,
    wherein a total content of the $BaF_2$, the $SrF_2$, the $AlF_3$, and the $CaF_2$ is more than 2% and 5% or less in terms of mass % relative to the total mass of the wire, and
    wherein a ratio of the total content of the $BaF_2$, the $SrF_2$, the $AlF_3$, and the $CaF_2$ to the total content of the fluoride powder $\{(BaF_2+SrF_2+AlF_3+CaF_2)/\text{Total of fluoride powder}\}$ is 0.5 or more.

6. The flux-cored wire according to claim 1, wherein a composition of the flux-cored wire further satisfies, in terms of mass % relative to the total mass of the wire,
    C: 0.5% or less,
    Si: 2.0% or less,
    Mn: 3.0% or less,
    Ni: 5% or less,
    Mo: 3.0% or less,
    W: 3.0% or less,
    Nb: 3.0% or less,
    V: 3.0% or less,
    Cr: 5% or less,
    Ti: 3.0% or less, N: 0.05% or less,
S: 0.05% or less,
P: 0.05% or less,
B: 0.05% or less,
Cu: 2.0% or less,
Ta: 3.0% or less, and
REM: 0.1% or less.

7. The flux-cored wire according to claim 6, wherein a total content of a metal powder and a metal compound that are constituted by one or a plurality of alkali metal elements in the flux-cored wire is 3% or less in terms of mass % relative to the total mass of the wire, and the balance includes Fe and impurities.

8. The flux-cored wire according to claim 1, wherein a composition of the flux-cored wire further satisfies, in terms of mass % relative to the total mass of the wire,
C: 0.5% or less,
Si: 2.0% or less,
Mn: 3.0% or less,
Ni: 5% to 20%,
Mo: 5.0% or less,
W: 3.0% or less,
Nb: 3.0% or less,
V: 3.0% or less,
Cr: 15% to 30%,
Ti: 3.0% or less,
N: 0.50% or less,
S: 0.05% or less,
P: 0.05% or less,
B: 0.05% or less,
Cu: 2.0% or less,
Ta: 3.0% or less, and
REM: 0.1% or less.

9. The flux-cored wire according to claim 8, wherein a total content of a metal powder and a metal compound that are constituted by one or a plurality of alkali metal elements in the flux-cored wire is 3% or less in terms of mass % relative to the total mass of the wire, and the balance includes Fe and impurities.

10. The flux-cored wire according to claim 1, wherein the strong deoxidizing metal element includes Mg in a form of a metal powder containing Mg, and a content of Mg included in the metal powder containing Mg and the content of the $AlF_3$ satisfy a relationship below in terms of amount of substance relative to the total mass of the wire:

$$1.0\times10^{-4} \leq Mg\ (mol/g) + AlF_3\ (mol/g) \leq 5.0\times10^{-4},$$

11. A weld metal formed by welding using the flux-cored wire of claim 1.

12. A welding method, comprising forming a weld metal using a flux-cored wire for straight polarity and a shielding gas,
wherein the flux-cored wire includes a flux comprising a fluoride powder and a metal powder,
wherein the fluoride powder comprises $BaF_2$ and at least one selected from the group consisting of $SrF_2$, $AlF_3$, and $CaF_2$, and contents of the $BaF_2$, the $SrF_2$, the $AlF_3$, and the $CaF_2$ satisfy, in terms of mass % relative to a total mass of the wire,
$BaF_2$: 1.0% to 4.5%,
$SrF_2$: 2.0% or less,
$CaF_2$: 0.45% or less, and
$AlF_3$: 0.70% or less,
wherein at least one of a metal element constituting the fluoride powder and a metal element constituting the metal powder is a strong deoxidizing metal element having at least one standard Gibbs energy of formation of −200 to −150 kcal/mol$O_2$ at 1500° C. to 1600° C. in an Ellingham diagram of an oxide of the strong deoxidizing metal element, and
wherein contents of an oxide and a carbonate in the flux satisfy, in terms of mass % relative to the total mass of the wire,
oxide: 0.5% or less, and
carbonate: 0.5% or less.

13. The welding method according to claim 12, wherein the shielding gas comprises a $CO_2$ gas at a proportion of 60% by volume or more.

14. The welding method according to claim 12, wherein the shielding gas comprises an Ar gas at a proportion of 60% by volume or more.

* * * * *